United States Patent
Ikeda et al.

(10) Patent No.: US 7,382,894 B2
(45) Date of Patent: Jun. 3, 2008

(54) METHOD FOR AUTOMATIC IDENTIFICATION OF A HAIR REGION

(75) Inventors: Hiroshi Ikeda, Tokyo (JP); Hideyuki Otsuka, Tokyo (JP); Keiichi Moriya, Tokyo (JP)

(73) Assignee: Kao Corporation, Tokyo (JP)

( * ) Notice: Subject to any disclaimer, the term of this patent is extended or adjusted under 35 U.S.C. 154(b) by 506 days.

(21) Appl. No.: 11/116,446

(22) Filed: Apr. 28, 2005

(65) Prior Publication Data

US 2005/0244057 A1    Nov. 3, 2005

(30) Foreign Application Priority Data

Apr. 30, 2004 (JP) ............................. 2004-136578
Apr. 22, 2005 (JP) ............................. 2005-125778

(51) Int. Cl.
*G06K 9/00* (2006.01)
(52) U.S. Cl. .................................. 382/100; 382/165
(58) Field of Classification Search ................. 382/100
See application file for complete search history.

(56) References Cited

U.S. PATENT DOCUMENTS

| | | | | |
|---|---|---|---|---|
| 4,813,000 A | * | 3/1989 | Wyman et al. ............. | 382/165 |
| 5,905,807 A | | 5/1999 | Kado et al. | |
| 6,141,431 A | * | 10/2000 | Munetsugu et al. ........ | 382/100 |
| 6,330,341 B1 | * | 12/2001 | Macfarlane et al. ........ | 382/100 |
| 6,343,141 B1 | * | 1/2002 | Okada et al. ............... | 382/118 |
| 6,707,929 B2 | * | 3/2004 | Marapane et al. .......... | 382/100 |
| 6,862,374 B1 | | 3/2005 | Nagai et al. | |
| 7,068,835 B1 | * | 6/2006 | Ban et al. ................... | 382/154 |
| 7,151,851 B2 | * | 12/2006 | Ladjevardi .................. | 382/162 |
| 2002/0015508 A1 | * | 2/2002 | Hannigan et al. ........... | 382/100 |
| 2002/0191812 A1 | * | 12/2002 | Kim .......................... | 382/100 |
| 2004/0131256 A1 | * | 7/2004 | Fujieda et al. .............. | 382/199 |
| 2004/0207881 A1 | * | 10/2004 | Nomura ..................... | 358/3.24 |

FOREIGN PATENT DOCUMENTS

| | | |
|---|---|---|
| EP | 0 725 364 A2 | 8/1996 |
| EP | 1 147 722 A1 | 10/2001 |
| JP | 11-188183 | 7/1999 |
| JP | 2001-195568 | 7/2001 |
| JP | 2003-346001 | 10/2003 |

* cited by examiner

*Primary Examiner*—Brian Werner
*Assistant Examiner*—Hadi Akhavannik
(74) *Attorney, Agent, or Firm*—Oblon, Spivak, McClelland, Maier & Neustadt, P.C.

(57) ABSTRACT

A method for automatic identification of a hair region is provided wherein edges are identified from an original image including a face and hair, the direction and length of the lines which form each individual edge are stored, line bundles in which lines of the same direction are gathered are searched, the color of the line bundles is established to be the hair color, line tracing is performed to identify lines which connect to line bundles and also have afore-mentioned hair color, and the pixels on the identified lines are established to be the hair region. A hair color simulation image is formed by changing the hair region, automatically identified in this manner, to a specified hair color.

5 Claims, 6 Drawing Sheets

FIG. 1A

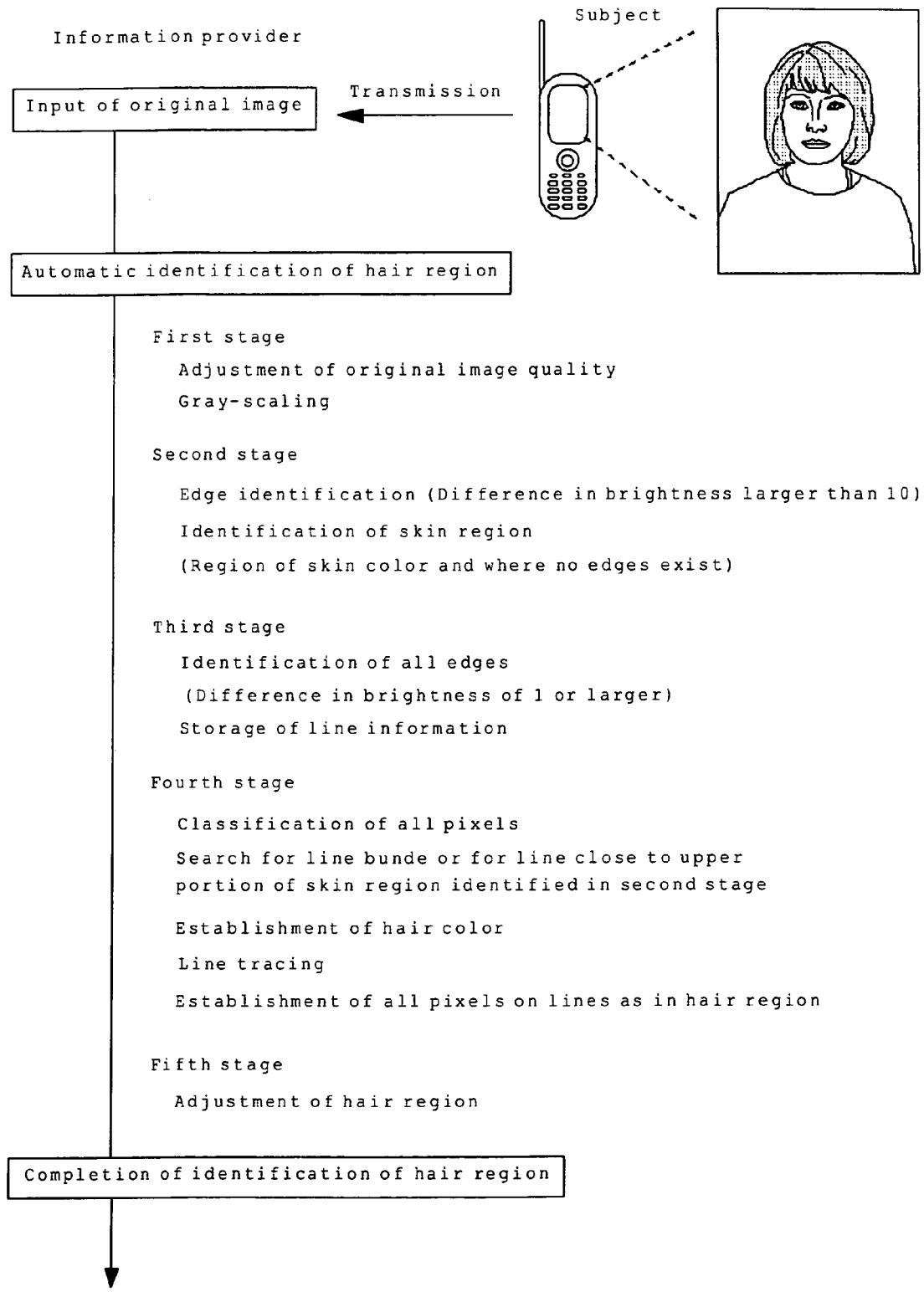

Information provider

Input of original image ← Transmission

Automatic identification of hair region

First stage
   Adjustment of original image quality
   Gray-scaling

Second stage
   Edge identification (Difference in brightness larger than 10)
   Identification of skin region
   (Region of skin color and where no edges exist)

Third stage
   Identification of all edges
   (Difference in brightness of 1 or larger)
   Storage of line information Fourth stage
   Classification of all pixels
   Search for line bunde or for line close to upper portion of skin region identified in second stage
   Establishment of hair color
   Line tracing
   Establishment of all pixels on lines as in hair region Fifth stage
   Adjustment of hair region Completion of identification of hair region

| 40 | 40 | 40 | 38 |
|----|----|----|----|
| 16 | (1) 40 | (2) 18 | 11 |
| 20 | 24 | 10 | 13 |

METHOD FOR AUTOMATIC IDENTIFICATION OF A HAIR REGION

FIELD OF THE INVENTION

The present invention relates to a method for automatically and precisely identifying the hair region from images of human beings photographed under various conditions and for forming a simulation image wherein the hair region thereof has been changed to a specified color and to a system for carrying out these methods.

BACKGROUND OF THE INVENTION

An advice service has been proposed (Japanese Patent Application Laid-open No. 2001-195568) wherein a subject transmits an image of his or her own face, including hair, to an information provider such as a maker of hair care products, and the information provider, using a calculating means, forms a simulation image wherein the hair region in that image is changed to the hair color desired by the subject and provides to the subject the simulated image and information related to the hair dye required to achieve, with the subject's hair, the hair color in that simulated image. In this case, distinguishing the hair region and the non-hair region of the original image is automatically done by means of a calculating device, based on such things as brightness, hue, and the continuity of changes thereto.

In recent years, communications networks such as the Internet have advanced and, moreover, even camera-equipped mobile telephones which utilize the Internet have come into widespread use, and thus it is expected that this advice system can be utilized easily and extensively by subjects.

However, for many images transmitted by subjects there are cases where, if the hair region is identified from those images based on a standardized reference, such as hue, the hair region cannot be accurately identified due to differences in photo-taking conditions such as camera model and lighting. Particularly in cases where the hair color is a light blonde, and hue and brightness are close to skin color, this tendency is large.

As a method for identification of the hair region, a method is known (Japanese Patent Application Laid-open No. H11-188183) wherein a region corresponding to the hair region is chosen from a two-dimensional image by dividing the two-dimensional image into the same hue regions, identifying the same hue and continuous regions and conducting matching with a prepared template. However, with this method, the hair region may not be identified accurately, for example, in the case where the hue of the skin color and the hair color are similar to each other and where the background is not a solid color.

SUMMARY OF THE INVENTION

In the present invention, there is thus provided a method for automatically and precisely identifying the hair region from images, which is, in respect to a large quantity of human images of various sizes, photographed under various photo-taking conditions, and in particular in respect to human images properly photographed under normal photographic conditions to completely automate identification of the hair region, and to enable forming a hair color simulation image in respect to a broad range of subjects.

The inventors of the present invention found that, while a hair image is a collection of lines, no line shapes exist in skin images and consequently that a hair region could be automatically identified according to the line connections therein.

In other words, the present invention provides a method for automatic identification of a hair region, including the steps of: identifying edges from an original image that includes face and hair regions;

storing the direction and length of the lines which form each edge;

searching a line bundle which is a gathering of lines of the same direction;

establishing the color of the line bundle as the hair color;

performing line tracing to identify lines having connections to the line bundle and having the hair color; and establishing the hair region to be the pixels on the identified lines.

Further, the present invention also provides a method for automatic identification of a hair region, including the steps of:

identifying edges from an original image which includes face and hair regions;

storing the direction and length of the lines of the same direction are concentrated;

identifying the region of that image, which region has skin color but has no edges, to be the skin region;

establishing a color of a line close to the upper portion of the skin region as the hair color;

performing line tracing to identify lines having the hair color and having connections to the line established as the hair color; and establishing the pixels on the identified lines as the hair region.

Further, the present invention provides a method of forming a hair color simulation image including the steps of: identifying the hair region from an original image, which includes face and hair regions, by means of the above-mentioned methods and forming a simulation image in which the hair region identified from the original image has been changed to a specified color.

Further, the present invention provides a hair color advice method including the steps of: inputting an original image which includes face and hair into an image storage means;

identifying the hair region from an original image, by means of the above-mentioned method;

forming a simulation image in which the hair region identified from the original image has been changed to a specified color chosen by the subject;

presenting the simulation image and the original image to the subject; and also based on a database of hair dyes and of hair colors before and after application of the hair dyes, outputting and presenting to the subject the hair dye for achieving on the subject's hair the hair color of the simulation image.

Further, the present invention provides a hair color advice system, containing an image storage means for storing an original image inputted thereto which image includes face and hair and a calculating means for forming and outputting a simulation image wherein the hair region of the original image has been changed to a specified hair color, wherein:

the calculating means identifies the hair region from the original image by means of the above-mentioned methods;

forms a simulation image in which, in the original image, the hair region identified therefrom has been changed to a specified color chosen by the subject;

outputs the simulation image and the original image to the subject; and further, based on a database of hair dyes and of hair colors before and after application of the hair dyes, outputs the hair dye for achieving on the subject's hair the hair color of the simulation image.

With the methods for automatic identification of a hair region of the present invention, the hair region is regarded as a specified collection of lines and the hair region is identified based on the connection of those lines. Consequently, it is possible to identify automatically and accurately the hair region for large quantities of human images of various sizes and photographed under various photo-taking conditions. In particular, it becomes possible to perform good hair region identification even in cases where the hue and brightness of the hair color are close to those of skin color.

Also, by means of the present invention the hair region and the skin region can readily be distinguished because the specific lines which form the hair region are not ones which form the skin region.

Furthermore, with the present invention, the direction and color of the lines used to identify the hair region change abruptly for parts where hair contacts shoulders, eyes and the like. Consequently, even in cases where with simple edge information or color information it is not possible to distinguish adequately between the hair region and regions other than hair, with the present invention, it becomes possible to distinguish between the hair region and regions other than hair automatically and adequately. Thus, in the case that the original image has been properly photographed under normal photo-taking conditions, in other words, in the case that the image is not too dark, is properly focused, and has not been affected by camera shake, it becomes possible to distinguish between the hair region and regions other than hair in a completely automated manner.

Consequently, by using the method for automatic identification of a hair region of the present invention and the method of forming a hair color simulation image of the present invention, it is possible, regardless of such things as the photo-taking conditions of the original image, to form a good simulation image in which the hair color of the hair region has been changed, and by means of the hair color advice method of the present invention which uses that simulation image or by means of a system for that purpose, the subject can readily grasp the change in appearance and feeling for the case that the subject's hair has been dyed to the desired color and the subject can know the hair dye necessary to dye his or her own hair the hair color of the simulation image.

DESCRIPTION OF THE PREFERRED EMBODIMENTS

Figure 1:
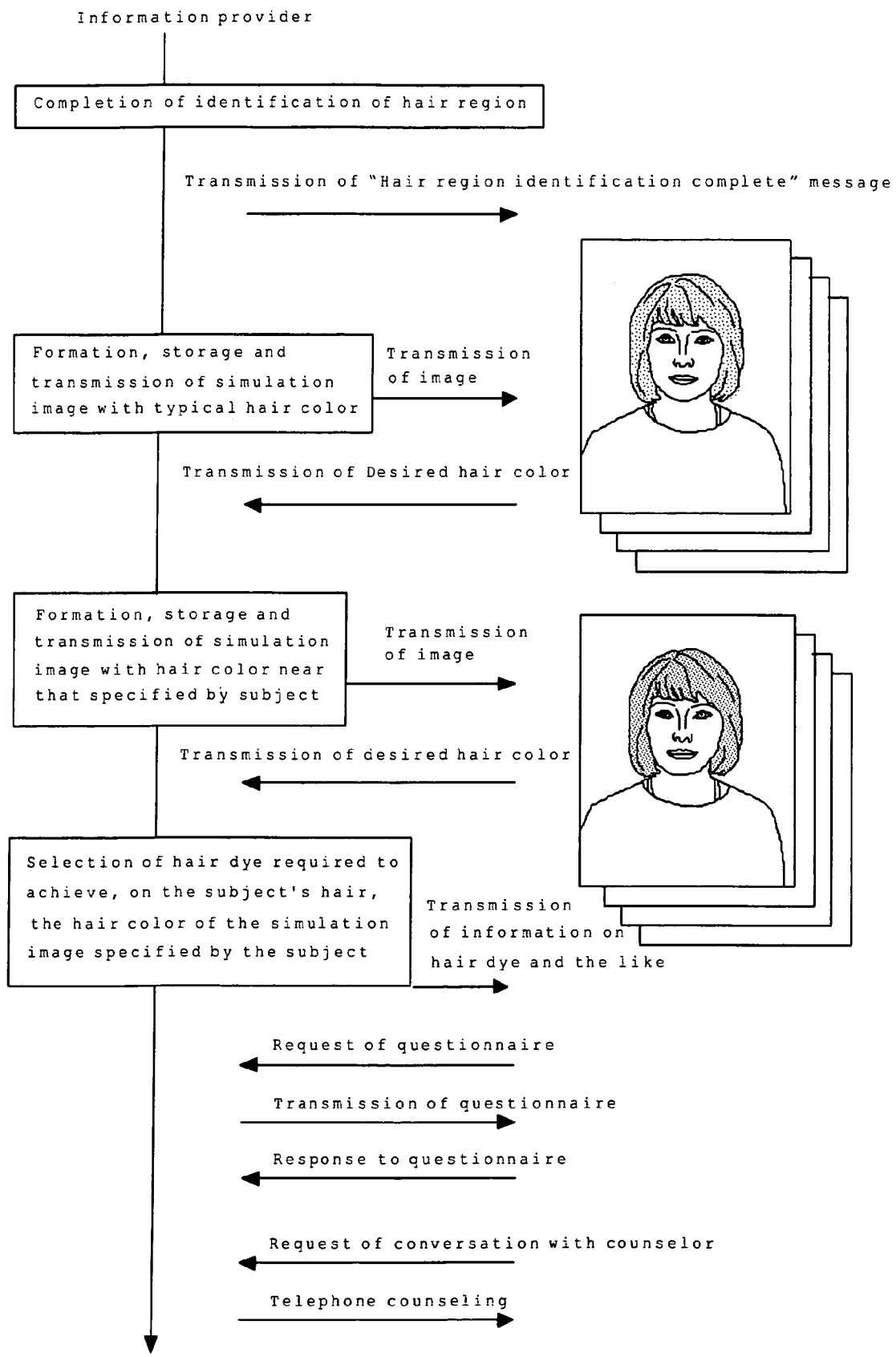
FIG. 1A is a flow diagram of one embodiment of a hair color advice method.
FIG. 1B is a flow diagram of one embodiment of a hair color advice method.
Figure 2:
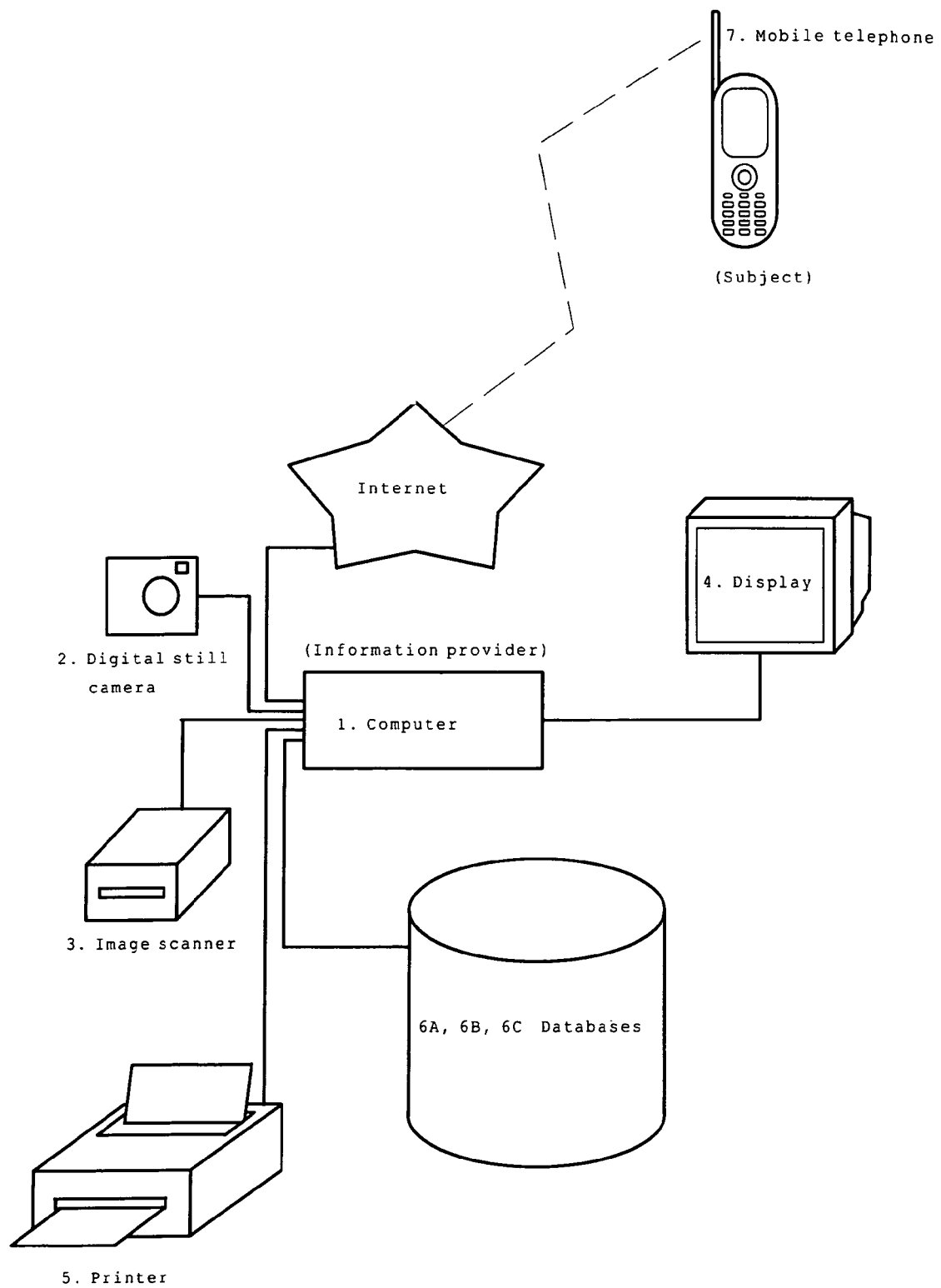
FIG. 2 is an example of a configuration of a hair color advice system.

Below the present invention will be described specifically, while referring to the figures. FIG. 2 is an example of a configuration of the hair color advice system of the present invention, and FIGS. 1A and 1B are flow diagrams of one embodiment of the hair color advice method of the present invention which uses the system of FIG. 2. They show the embodiment wherein the subject and an information provider send and receive information between them via the subject's mobile telephone which has a camera and is Internet-compatible.

The system of FIG. 2 is a system managed by an information provider, such as a maker of hair care products, and provides a personal computer main unit 1 as an image storage means, to which the subject's image information is inputted and in which that information is stored, and as a calculating means for discriminating the subject's hair region in that image. A digital still camera 2 for photographing the subject and an image scanner 3, for reading in image information from the subject's photograph, are connected to the personal computer main unit 1 as means of scanning an image, and moreover a device is incorporated in that main unit 1 which enables image information to be read in via a communication line such as the Internet. A display 4 and a printer 5 are connected to the personal computer main unit 1 and these appropriately output the subject's image information, the simulation image, and the like which are stored in personal computer main unit 1. Likewise, database 6a, which stores the relationship between hair dye and hair color before and after application of hair dye, database 6b, which stores product information on hair care products, and database 6c, which stores personal information such as customer address, name, age, presence or absence of gray hair, hair stiffness, history of hair care products used in the past, are connected to personal computer main unit 1.

With the method of FIG. 1A and FIG. 1B, first the subject photographs a bust image of him or herself (the original image), including face and hair, with the camera attached to a mobile telephone 7 and transmits it to the information provider. The information provider inputs the original image transmitted from the subject into the image file of the personal computer main unit 1 and stores it therein. As for the method by which the information provider stores the subject's original image, in addition to that mentioned above, it is acceptable to photograph the subject with the digital still camera 2, input the image information thereof into the image file of the personal computer main unit 1, and store it therein; to capture image information from a photograph of the subject with the image scanner 3 and to input that image information into the personal computer main unit 1; or to input into the personal computer main unit 1 the subject's image information already recorded in any optional recording medium. There are no limitations as to the method of inputting the image information into the personal computer main unit 1.

At the image provider, upon obtaining the subject's original image, the hair region is automatically identified by means of the calculating means within the personal computer main unit 1, as follows.

With this method for automatic identified of hair region, as the first stage, quality adjustment and gray-scaling of the original image of the human image are performed. More specifically, first, in order to make the hair lines clear, the brightness and contrast of the entire original image are adjusted and a sharp image is created. Next, so that no unneeded colors are generated through the further image processing which would make it difficult to identify the hair region, a monochrome black and white image of 256 gradations is created by gray-scaling. Then, noise is eliminated from the entire image using a median filter or the like. Moreover, if necessary, the difference in brightness of neighboring pixels may be increased through sharpening.

In second stage, the skin region is identified. For this purpose, first, edges are identified from the gray-scaled image. The identification of edges itself can be performed by commonly-known first-order derivative processing, but in the present invention it is preferable to eliminate the noise of the skin region and make it so that skin wrinkles are not identified as edges of he hair region, by ignoring edges where the light-dark difference is small (for example, comparing to surrounding pixels and ignoring edges for which the absolute value of the brightness difference is 10 or less.) To be more specific, edge identification can be performed by scanning the following 1-pixel unit processing for all pixels from the upper left to the lower right of the image.

For 1-pixel unit processing, the average value of the brightness numerical values for the one pixel which is the object of processing and for all the surrounding pixels in eight directions are found, and in the case that the brightness of the said pixel is smaller or larger than the average value and that difference is greater than 10, 128−(difference from the average value) or 128+(difference from the average value) is written into the pixel position of the edge buffer. Also, in the case that the brightness is within the range of the average ±10, 0 is written in, meaning "no edge."

For example, in the pixel arrangement of FIG. 3 (a gray-scale image of 256 gradations), in the case that pixel (1) is taken as the pixel which is the object of processing, the average value within the 3×3 square is 28, as in the following equation. The pixel value of (1) is 40, so in respect to the average value, it is a value more than 10 larger and the value written into the edge buffer becomes 128+(difference from the average: 12)=140.

The case where pixel (1) is taken as the pixel which is the object of processing.

The total of the 3×3 pixel values:

40+40+40+16+40+18+20+24+10=248.

The average value of the 3×3 pixel values:

248÷9≅28 (fractions rounded to nearest whole number).

The difference from average:

40−28=12.

The value written into the edge buffer:

128+12=140.

Similarly, in the case where pixel (2) is taken as the pixel which is the object of processing, the average value in the 3×3 square is 26, as in the following equation. Since the pixel value of (2) is 18, the average value is within the range of +/−10 and the value written into the edge buffer is zero.

In the case where pixel (2) is taken as the pixel which is the object of processing, the total of the 3×3 pixel values:

40+40+38+40+18+11+24+10+13=234.

The average value of the 3×3 pixel values:

234÷9=26.

The difference from average:

18−26=−8

The value written into the edge buffer:

Because the difference from the average is within the range of ±10, the value to be written in becomes 0.

Next, it is determined which of the three cases applies for each of the pixel values written into the edge buffer: larger than 138, smaller than 118, or 0.

Figures 3, 4:
FIG. 3 is an explanatory drawing of 1-pixel unit processing method used for edge identification.
FIG. 4 is an edge buffer image obtained by ignoring edges where the absolute value of the difference in brightness is 10 or less.

FIG. 4 is an example of an edge buffer image obtained when edges for which the absolute difference value in brightness is 10 or less are ignored.

After identifying edges in this way, the original image is referred to and regions which are of skin color and for which the numerical values of the pixels written into the edge buffer are 0 are all taken to be skin regions. Here it is preferable that in the general case for Japanese people "skin color" be taken as the region for which, under the HSV color model, hue is from 10 to 45 and brightness is 100 or more.

Also, when identifying the skin color region, it is preferable to maximize the area of the continuous region of skin color by performing color correction of the original image with a color model different from the color model for determining whether or not a pixel goes into the skin color region. For example, color correction of the original image is performed with the parameters of the RGB color model so that the area of the original image which goes into the skin color region under the HSV color model is maximized. By doing this, it becomes possible to identify the skin region more precisely regardless of such things as the camera model used to photograph the image or the photo-taking conditions (specifications of patent application number 2003-346001).

In the third stage, line information is created from the edges. Because this line information will be used to identify the hair region, here, in the image that was gray-scaled, all edges are identified regardless of the magnitude of the difference in light and dark (more specifically, edges for which the absolute value of the light-dark difference is 1 or larger). In the same manner as in the second stage, edge identification can be done by performing 1-pixel unit processing and scanning all the pixels from the upper left of the image to the lower right. However, for 1-pixel unit processing here, the average value of the brightness numerical values for the one pixel which is the object of the processing and for all the surrounding pixels in eight directions are found, and in the case that the brightness of the pixel which is the object of the processing is smaller than the average value by 1 or more, 128−(difference from the average value) is written into the pixel position of the edge buffer, or in the case that it is greater than the average value by 1 or more, 128+(difference from the average value) is written therein.

Also, in the case that the absolute value of the difference from the average brightness is less than 1 (the case that the brightness and the average are substantially the same), 0 is written in, meaning "no edge." Then it is judged which of the three, 129 or more, 127 or less, or 0, is the numerical value for each individual pixel written into the edge buffer.

Figure 5:
FIG. 5 is an edge buffer image obtained by enabling edges where the absolute value of the difference in brightness is 1 or more.

FIG. 5 is an example of the edge buffer image obtained by enabling edges where the absolute value of the difference in brightness is 1 or more.

After identifying all edges, the shapes of all edges are inspected and, for each edge, at least the direction and length of the lines which comprise that edge are stored as line information. In this case, forms with complicated wave shapes are divided to a degree where they can be represented by the above-mentioned line information.

For line direction, for example as in Table 1, it is acceptable to store 15° increments of angle as numerical values from 0 to 11.

TABLE 1

| Direction | Angle (°) |
|---|---|
| 0 | 0 |
| 1 | 15 |
| 2 | 30 |
| 3 | 45 |
| 4 | 60 |
| 5 | 75 |
| 6 | 90 |
| 7 | 105 |
| 8 | 120 |
| 9 | 135 |
| 10 | 150 |
| 11 | 165 |

In order to make it clear in which line each pixel is included, it is preferable that the line information is managed according to serial numbers, and each pixel of image has one of the serial numbers. In this way, it becomes possible to refer readily to the line corresponding to a pixel.

In the fourth stage, the hair region is identified using the line information. For that, first, a general color classification is made for all the pixels of the original image.

Color classification can be done by five classes; for example, black, brown, gold, skin color and "other," as in Table 2, and checking in order to which color classification a site being determined corresponds. More specifically, judgment is made whether a site for which color evaluation is being done corresponds to skin color or not, and if not, it is judged whether it corresponds to gold or not, and thereafter, the same kind of judgments are repeated.

TABLE 2

| Skin color | Hue 10 to 30, brightness 100 or more |
|---|---|
| Gold | Hue 30 to 55, brightness 128 or more |
| Brown | Hue 10 to 40, brightness 128 or less |
| Black | (1) Luminance 70 to 102, saturation of 76 or less, hue of 10 or less or of 310 or more, brightness of 150 or less, or |
| | (2) Luminance of 76 or less, or |
| | (3) Hue of 30 to 70, brightness of 150 or less, luminance of 166 or less, saturation of 102 or less |
| Other | Other than noted above |

In identifying the skin region in the second stage, it was stated that it is preferable for the region with hue 10 to 45 and brightness 100 or more to be judged to be skin color. However, in identifying the hair region, to enable a "golden" classification it is preferable to make the setting values for skin color: hue 10 to 30 and brightness 100 or more.

Further, even in this case, when identifying the skin color region, it is preferable to maximize the area of the continuous region of skin color by performing color correction of the original image with a color model different from the color model for determining whether or not a pixel goes into the skin color region (see the specification of Japanese Patent Application No. 2003-346001).

Figure 6:
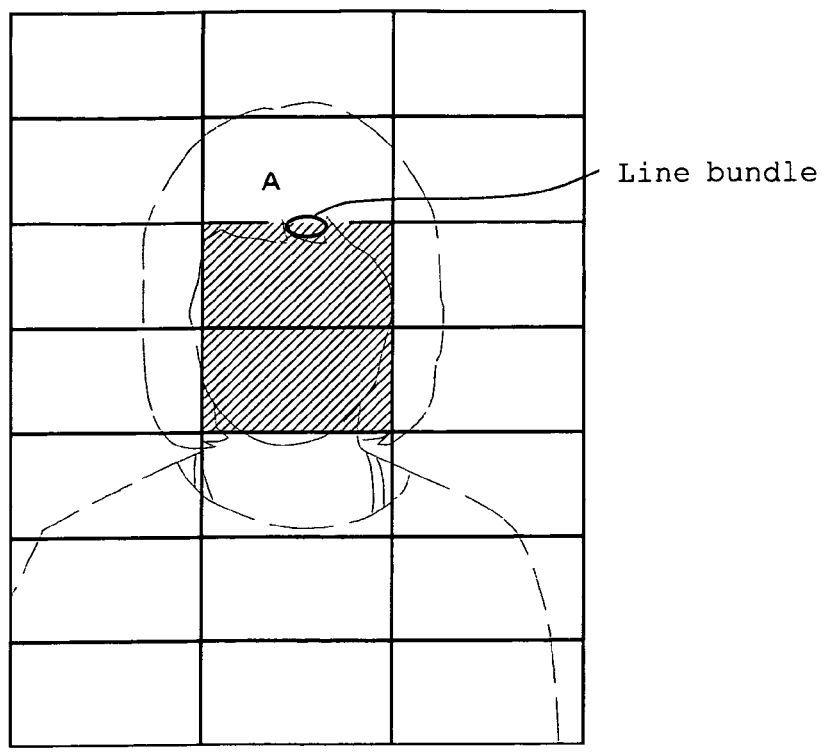
FIG. 6 is an explanatory drawing of a skin region identification method.

Next, based on the above-mentioned color classifications, the skin portion within the image is found. As a specific method for this, by dividing the overall image into, for example, 3 parts horizontally and 7 parts vertically, as shown in FIG. 6, a total of 21 blocks may be made. The blocks with skin color to brown color are found to the extent of 5×5 pixels within the area A which is the two blocks in the vertical direction, starting from the block that is number 2 horizontally and number 2 vertically. Here, the size called "5×5 pixels" is the minimum size that can establish the skin color region regardless of image size. Note that identification of the skin portion is done by finding the blocks with the above-mentioned colors in order from skin color to brown.

From the skin portion found in this way, locations are searched which are above and wherein there exists a gathering of at least 2 lines in the same direction, and those portions of gathered lines are considered line bundles. As a method of searching line bundles, the image is divided into squares; data on line attributes (the combination of direction, length, and color classification) is taken for each divided area; the most numerous attribute is found; next the maximum area is found in which lines of that attribute are dispersed throughout the entire area; and the collection of lines of that area is taken as a line bundle.

When searching a line bundle, because the lines originate from hair, it is also acceptable to inspect lines of a specified length or longer. Alternatively, on the assumption that the face portion exists in the upper half of the image, it is also acceptable to take only the upper half of the image as the region subject to searching.

After searching line bundles, the hair color can be established from the color classification of those line bundles.

Next, a line bundle is taken as the starting point and line tracing is done to identify all the lines that connect to this bundle and are of the color established as the aforementioned hair color. It is preferable that the lines which are line traced be ones connected to each other smoothly. The degree of smoothness acceptable here, for example for a line of direction 1 in Table 1 (inclination of 15°), is made the range from direction 0 (inclination of 0°) to direction 2 (inclination of 30°).

Further, because there are cases of abrupt change in direction between mutually connecting lines in the vicinity of hair parting, it is preferable to perform the line tracing without setting a limit on the degree of smoothness. The image region for which no limit on the degree of smoothness is stipulated is set as the upper side of the skin region identified in the second stage.

Figure 7:
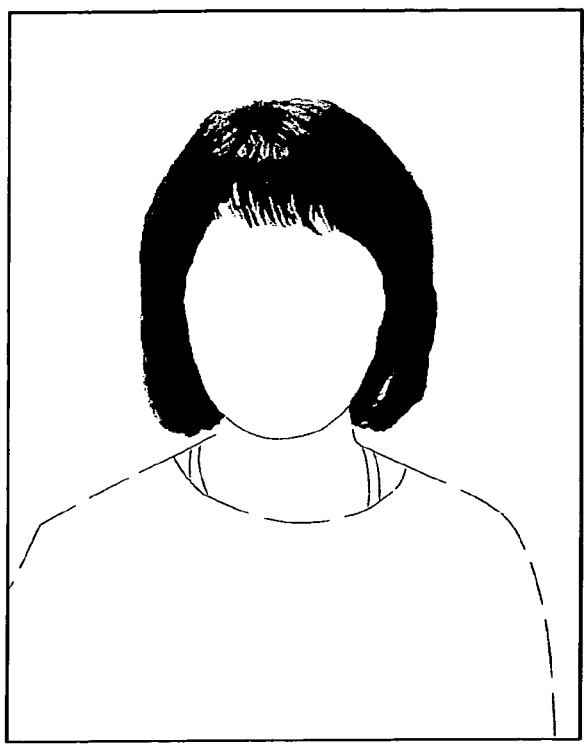
FIG. 7 is a drawing showing an identified hair region.

As shown in FIG. 7, all the pixels on the lines identified in this way are identified to be in the hair region. Fine gaps on the order of a few dots, between the lines, are also identified at the same time as in the hair region.

Further, since the skin region identified in the second stage adjoins the upper portion thereof the hair region, the starting point of the line tracing may be used as a line close to the upper portion of the skin region. In this case, based on the color classification of the line close to the upper portion of the skin region, the hair color can be established and the line tracing can be performed as similar to the case of performing line tracing based on line bundles.

In the fifth stage, the hair region identified in the fourth stage is adjusted as necessary.

For example, in the case that the hair is golden, because this is similar to skin color, the edge of the skin region may be identified as a hair line. To deal with this, in the case that the hair is golden, it is preferable to perform the following processing. First, to the left and right from the center of the image, which is normally the center of the face, the skin region is checked in terms of skin color (hue of 10 to 45, brightness of 100 or more), and is taken to be the skin region up to the locations where the skin region becomes sparse. The remaining regions are established not to be the skin region. Additionally, the same type of processing is performed on the skin region above the center of the face.

Continuing, the skin region obtained in this manner is superimposed onto the hair region identified in the fourth stage from the line information, and the remaining hair region is identified as the final hair region.

After identifying the hair region from the original image in this way it is made such that, if necessary, a message can be transmitted to the subject indicating that the hair region identification has been completed.

Next, the information provider automatically forms a simulation image in which the hair region of the original image is changed to one or a plurality of typical hair colors, and transmits this to the subject while storing it in the computing device. Alternatively, it can also be made such that, after receiving the message indicating that the hair region identification has been completed, the subject can loosely specify the desired hair color and transmit it to the information provider. Then the information provider forms a simulation image in which the hair color region has been changed to the hair color specified by the subject and transmits it to the subject.

Here, in forming the simulation image, it is preferable to use a simulation software that, while reflecting the color of the hair region of the original image, superimposes thereon a color of the specified hue and brightness.

Further, it is preferable to transmit the original image along with the simulation image, so that both can be compared.

The subject checks on the screen of his or her mobile telephone the hair color simulation image that was transmitted and, selects from among the colors therein his or her favorite color, transmits that color to the information provider.

The information provider stores the color that was transmitted and also, forming again a simulation image with one or more hair colors close to that favorite color, transmits it with the original image to the subject.

The subject selects again his or her favorite color from within the transmitted simulation image and transmits that color to the information provider. The color specification by the subject and the formation of the simulation image by the image provider can be repeated until the subject is fully satisfied.

Once a simulation image is formed that is satisfactory to the subject, at the information provider, the personal computer main unit 1, based on the database 6a of hair dyes and of hair colors before and after application of hair dye, which database was stored ahead of time, transmits the subject information (for example, type of the required hair dye, color number, product name, method of use, and the like) related to the hair dye required to achieve on the subject's hair that hair color in the simulation image selected by the subject. This information may also be transmitted to the subject in an animated form. Also, the information can be outputted by the printer 5 and sent to the subject by direct mail. Further, it is preferable that a simulation image of the hair color and an image of the actual product be displayed in the hair dye output screen transmitted to the subject or sent by mail. By this means, the subject can know for certain the hair dye required to obtain the desired hair color on his or her own hair.

A questionnaire function or a function for dialog with a counselor may also be added to the hair color advice system of the present invention.

As a questionnaire function, by having the subject access the information provider via a mobile telephone, the information provider can transmit a questionnaire to the subject, asking about such things as address, name, age, presence or absence of gray hair, hair stiffness, history of hair care products used in the past, present hair color, present hair length, preferred applicator, and preferred dying method, and it is made such that the questionnaire is displayed on the screen of the mobile telephone. The subject responds to the questionnaire and transmits the answers by means of the select button on the mobile telephone. The information provider registers the answers in the customer database 6c.

Further, it is acceptable to provide a button in the questionnaire whereby counseling in the form of a conversation with a counselor may be requested, so that if the subject, by pushing this button, requests a conversation with a counselor it is made so that at the information provider a counselor telephones the subject and the counselor directly confers with the subject.

The method or the system of the present invention may take various embodiments other than these. For example, it is acceptable for the subject to send and receive information using a personal computer, without being limited to a mobile telephone. Likewise it may be made that the subject visits a store or the like where the information provider's system is installed and receives counseling there.

The automatic hair identification method of the present invention, the hair color simulation image forming method of the present invention which uses that identification method, and the hair color advice method and the system therefor are useful in fields such as counseling related to hair color and sales and promotion of hair dyes.

The entire disclosure of the specification, claims, summary and drawings of Japanese Patent Application Nos. 2004-136578 and 2005-125778 filed on Apr. 30, 2004 and Apr. 22, 2005, respectively, are hereby incorporated by reference.

What is claimed is:

1. A method for automatic identification of a hair region, comprising the steps of:
   identifying edges from an original image which includes face and hair regions;
   storing a direction and length of the lines which form each edge;
   searching a line bundle in which lines of a same direction are gathered;
   establishing a color of the line bundle as a hair color;
   performing line tracing to identify lines having connections to the line bundle and having the hair color; and
   establishing pixels on the identified lines as the hair region.

2. The method for automatic identification of a hair region according to claim 1, comprising the steps of:
   identifying edges from an original image which includes face and hair regions; and
   identifying the region of that image, which region is skin color but has no edges, to be the skin region.

3. A method of forming a hair color simulation image comprising the steps of:
   identifying a hair region from an original image which includes face and hair regions, by
   identifying edges from the original image which includes the face and hair regions;

storing a direction and length of lines which form each edge;

searching a line bundle in which lines of the same direction are gathered;

establishing a color of the line bundle as a hair color;

performing line tracing to identify lines having connections to the line bundle and having the hair color; and establishing pixels on the identified lines as the hair region; and forming a simulation image in which the hair region identified from the original image has been changed to a specified color.

4. A hair color advice method comprising the steps of:

inputting an original image which includes face and hair into an image storage means;

identifying a hair region from the original image, by identifying edges from the original image which includes a face region and the hair region;

storing a direction and length of lines which form each edge;

searching a line bundle in which lines of a same direction are gathered;

establishing a color of the line bundle as a hair color;

performing line tracing to identify lines having connections to the line bundle and having the hair color; and establishing pixels on the identified lines as the hair region;

forming a simulation image in which the hair region identified from the original image has been changed to a specified color chosen by the subject;

presenting the simulation image and the original image to the subject; and further, based on a database of hair dyes and of hair colors before and after application of the hair dyes, outputting and presenting to the subject a hair dye for achieving on the subject's hair the hair color of the simulation image.

5. A hair color advice system, comprising:

an image storage means for storing an original image inputted thereto which image includes face and hair; and a calculating means for forming and outputting a simulation image wherein the hair region of the original image has been changed to a predetermined hair color, wherein:

the calculating means identifies the hair region from the original image by identifying edges from the original image which includes a face region and the hair region;

storing a direction and length of lines which form each edge;

searching a line bundle in which lines of a same direction are gathered;

establishing a color of the line bundle as the hair color;

performing line tracing to identify lines having connections to the line bundle and having the hair color; and establishing pixels on the identified lines as the hair region, wherein the hair color advice system and the calculating means forms a simulation image in which, in the original image, the hair region identified therefrom has been changed to a color chosen by the subject;

outputs the simulation image and the original image to the subject; and further, based on a database of hair dyes and of hair colors before and after application of the hair dyes, outputs a hair dye for achieving on the subject's hair the hair color of the simulation image.

\* \* \* \* \*